Aug. 11, 1953 W. I. JONES 2,648,091
FASTENER ASSEMBLY
Filed April 26, 1951
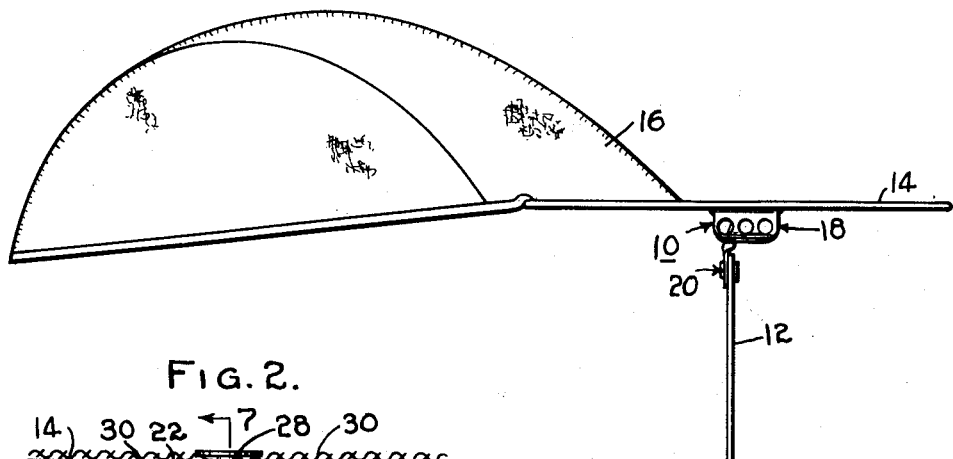
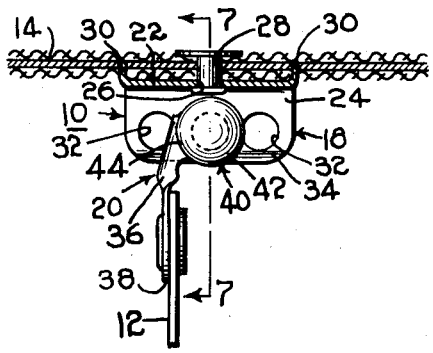
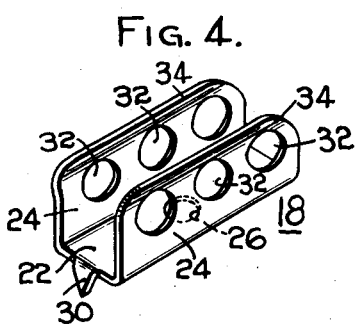
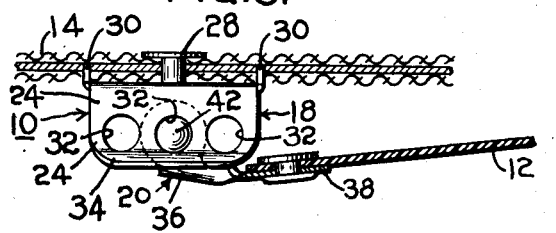
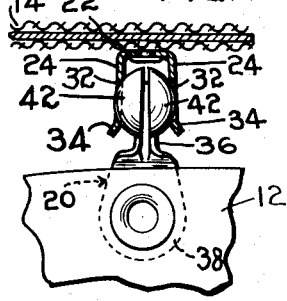
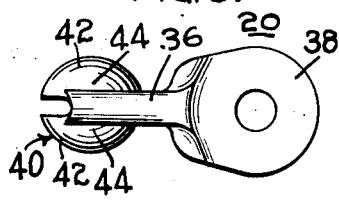
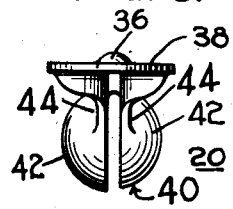
INVENTOR:
WALTER I. JONES,
BY Robert E. Ross
AGENT.

Patented Aug. 11, 1953

2,648,091

UNITED STATES PATENT OFFICE 2,648,091

FASTENER ASSEMBLY

Walter I. Jones, Belmont, Mass., assignor to United-Carr Fastener Corporation, Cambridge, Mass., a corporation of Massachusetts Application April 26, 1951, Serial No. 222,975

3 Claims. (Cl. 16—140)

This invention relates generally to stud and socket assemblies and has particular reference to such an assembly for use in attaching an eyeshield to a visor of a cap or the like.

The object of the invention is to provide a stud and socket assembly in which the stud is capable of substantial tilting movement in the socket.

A still further object of the invention is to provide a stud and socket assembly in which the socket is adapted to receive the stud in a plurality of positions.

A still further object of the invention is to provide a resilient stud member and a socket member, in which the socket member has a longitudinal series of pairs of openings to receive opposing convex portions of the resilient stud in snapping engagement.

Other objects of the invention will, in part, be obvious, and will, in part, appear hereinafter.

In the drawing:

Fig. 1 is a view in elevation of a cap and eyeshield assembly which utilizes a stud and socket assembly having the features of the invention;

Fig. 2 is an enlarged view in elevation, partly in section, of the stud and socket assembly of Fig. 1 in which the eyeshield is in the down position;

Fig. 3 is a view similar to Fig. 2 in which the eyeshield is in the up position;

Fig. 4 is a perspective view of a socket member embodying the features of the invention;

Fig. 5 is a plan view of a stud member for use in the assembly of Figs. 1 to 3;

Fig. 6 is an end view of the stud member of Fig. 5; and

Fig. 7 is a view in section taken on line 7—7 of Fig. 2.

Referring to the drawing, there is illustrated a stud and socket snap fastener assembly 10, which is adapted for use in attaching an eyeshield 12 to the visor 14 of a cap 16 or the like. The assembly 10 comprises a socket member 18 for attachment to the visor 14 and a stud member 20 for attachment to the eyeshield 12.

In the preferred embodiment, the socket 18 comprises an elongated base 22 and a pair of spaced parallel side walls 24 disposed therein. The base 22 is provided with a central opening 26 for receiving an attaching rivet 28 and a pair of pointed tongues 30 disposed at the ends thereof for piercing the visor 14 to prevent rotation of the socket thereon. The walls 24 are provided with openings 32, which are spaced thereon to provide a series of pairs of opposing openings to receive the stud in snapping engagement therewith. To facilitate assembly of the stud into the socket, the top of each wall is provided with an outwardly flared portion 34.

The stud 20 comprises generally a channel-shaped arm portion 36 having a flat end portion 38 for attachment to the eyeshield 12, and a socket-engaging portion 40 at the other end. The socket-engaging portion 40 comprises a pair of spaced convex portions 42 having peripheral portions 44 which are attached to opposite sides of the channel-shaped arm so that the convex portions are flexible toward and away from each other.

The width of the socket-engaging portion is greater than the distance between the walls 24 so that when said portion is assembled into the socket, the convex portions flex toward each other and then snap outwardly into a pair of opposing openings. The convex portions 42 are larger than the openings 32 so that the line of engagement of the edge of the opening with the surface of the concave portion is normally spaced from the outer periphery of the concave portion. Engagement in this manner not only allows tilting of the stud relative to the socket in a direction parallel to the plane of the walls, but also allows substantial tilting of the stud in a direction perpendicular to the plane of the walls without interference between the edges of the opening and the periphery of the convex portion. Such sideways tilting is essential for smooth operating of the eyeshield since in many cases either the visor or the eyeshield is transversely curved, so that when the eyeshield is moved from one position to another, the stud does not move in a direction exactly parallel to the plane of the walls 24, but may move at an angle thereto.

Since the convex portions 42 are attached to the arm 36 so that the arm extends substantially tangentially therefrom, the eyeshield may be moved to the up position without interference between the arm and the socket walls (see Fig. 3). The frictional engagement between the socket and the stud is sufficient to retain the eyeshield in any predetermined position.

Since certain obvious modifications may be made in the device without departing from the scope of the invention, it is intended that all matter contained herein be interpreted in an illustrative and not in a limiting sense.

I claim:

1. A snap fastener assembly, comprising a socket member and a stud member for cooperating snapping engagement and for substantial tilting movement relative to each other after engagement, said socket member comprising a base portion for attachment to a support, a pair of spaced elongated side walls disposed on the base, said side walls having a series of pairs of opposing openings spaced longitudinally therein, said stud having a width greater than the distance between said walls and having opposing convex surfaces having a diameter greater than the diameter of the openings in the socket member for snapping engagement therein.

2. A snap fastener assembly, comprising a socket member and a stud member for cooperating snapping engagement and for substantial tilting movement relative to each other after engagement, said socket member comprising a base portion for attachment to a support, a pair of spaced parallel side walls extending upwardly from the base, said walls having a plurality of longitudinally spaced pairs of opposing openings extending therethrough, the upper edges of said side walls being flared outwardly above the openings; said stud member having a width greater than the distance between said walls and having opposing portions with convex surfaces having a diameter greater than the diameter of the openings in the socket member, said opposing portions of the stud member being flexible toward and away from each other for snapping engagement into an opposing pair of said openings.

3. A snap fastener socket member for receiving a stud member in snapping engagement so that the stud member is capable of substantial tilting in the socket member, said socket member comprising a base for attachment to a supporting member, prong means extending from the base to pierce into the supporting member to prevent rotation of the socket member, a pair of spaced side walls extending upwardly from the base, and having upper flaring edge portions, said side walls having a plurality of longitudinally spaced pairs of opposing openings extending therethrough to receive the stud member in snapping engagement therein between the walls, whereby said stud member may be engaged in the socket member in a plurality of positions.

WALTER I. JONES.

References Cited in the file of this patent

UNITED STATES PATENTS

| Number | Name | Date |
| --- | --- | --- |
| 566,339 | Richardson | Aug. 25, 1896 |
| 2,475,471 | Brown et al. | July 5, 1949 |
| 2,500,280 | Feldman | Mar. 14, 1950 |
| 2,533,626 | Reiter | Dec. 12, 1950 |
| 2,561,225 | Powell | July 17, 1951 |

FOREIGN PATENTS

| Number | Country | Date |
| --- | --- | --- |
| 22,519 of 1929 | Australia | Sept. 19, 1930 |